Feb. 16, 1960 M. E. WOOD 2,925,229
SPINNING REEL

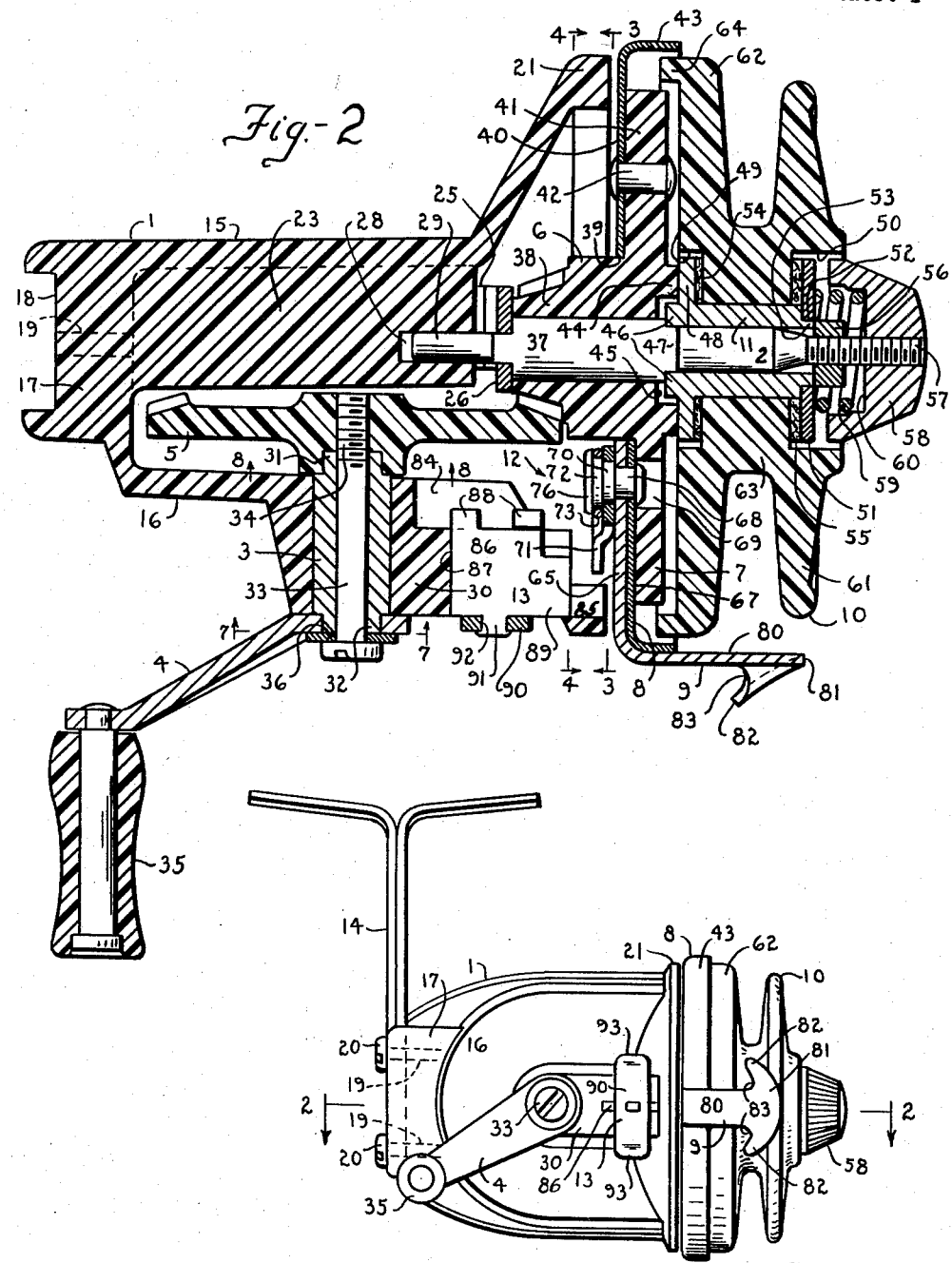

Filed June 22, 1955 2 Sheets-Sheet 2

INVENTOR.
MORRIS E. WOOD
BY
Charles S. Penfold
ATTORNEY

United States Patent Office 2,925,229
Patented Feb. 16, 1960

2,925,229

SPINNING REEL

Morris E. Wood, Bronson, Mich., assignor to Higbie Manufacturing Company, Rochester, Mich., a corporation of Michigan Application June 22, 1955, Serial No. 517,230

1 Claim. (Cl. 242—84.2)

The invention relates generally to fishing reels and more particularly is directed to what is known as a spinning reel in which a rotor serves to direct a line onto a relatively stationary spool.

One of the principal objects of the invention is to provide a reel comprising, among other things, a housing, a spindle mounted axially in the housing, a drive shaft mounted on the housing, a drive gear operated by the shaft, a driven gear mounted on the spindle and meshing with the drive gear, a cup-shaped rotor carried by the driven gear, a dual line guide device on the rotor, a tubular bearing keyed to the spindle, a spool mounted on the bearing, a dual pawl device mounted on the guide device or rotor, and a manual operable stop engageable with the pawl to stop rotation of the rotor in either of two directions.

More particularly, an important object of the invention is to provide a housing which is preferably of a one-piece or integral construction, formed by moulding or casting operation. The housing is preferably made of a phenolic condensate but any material of the pyroxylin plastic class or light metals may be utilized.

A significant object of the invention is to provide a spindle and a bracket for securing the spindle to the housing.

A particular object of the invention is to provide the housing with a pair of internal axially extending formations for supporting the ends of the bracket and a center formation for receiving the inner end of the spindle to impart stability to the spindle.

Another object of the invention is to provide the driven gear with a flat round portion which serves to support the rotor with its base located between the round portion and the teeth of the gear.

A specific object of the invention is to provide the rotor with a dual line pickup or directing device of a unique character which offers advantages to a left or right handed person in retrieving the line.

Also, an object of the invention is to provide a reel in which improved means are utilized to control the friction or drag of the spool relative to its bearing.

A further object of the invention is to provide a novel reversible spring pressed pawl device, preferably mounted on the pickup device for engaging the stop above referred to.

An additional object of the invention is to provide a reversible mounting means for mounting the reel on a pole or rod in either of two positions. This reversibility of the mounting means and reversibility of the pawl device offers a reel which can be readily converted for use by either a right or left handed person.

Other advantages and attributes of the reel reside in its simplicity of design and construction, durability, efficient and quiet operation, and low cost of manufacture and assembly.

Many other objects and advantages of the invention will become apparent after the description hereinafter set forth is considered in conjunction with the drawings annexed hereto.

In the drawings:

Figure 1 is an elevational side view of a reel embodying the invention;

Figure 2 is an enlarged longitudinal sectional view, taken substantially on line 2—2 of Figure 1;

Figure 3:
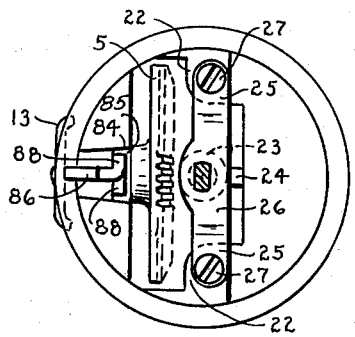
Figure 3 is a transverse sectional view taken substantially on line 3—3 of Figure 2.
Figure 5:
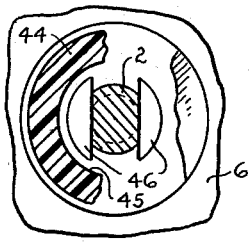
Figure 5 is a partial transverse section taken through the reel showing the connection between the tubular bearing and the spindle.

Referring first to the structure exemplified in Figures 1 through 9 of the drawing, numeral 1 generally designates a housing, 2 a spindle, 3 a tubular shaft driven by a crank 4 for rotating a drive gear 5, 6 a driven gear member having a round portion 7 which carries a rotor or flyer 8 provided with a line pick-up device 9 for directing a line onto a spool 10 mounted on a tubular bearing 11 keyed to the spindle, a pawl device 12 movable with the rotor and engageable with a manually operable stop 13 mounted on the housing, and mounting member 14 for attaching the reel to a support, such as a pole or rod.

The housing is preferably moulded from a phenolic and includes a generally rectangular body having a chamber, substantially rectangular in cross-dimension, defined by a plurality of walls including a pair of side walls 15 and 16 and an end wall 17 at the rear extremity of the housing. The end wall is provided with a transverse recess 18 and apertures 19 for receiving screws 20 to detachably secure an end of the mounting member 14 in the recess in either of the two positions illustrated in Figures 1 and 9, all of which will be described more in detail subsequently. The forward extremity of the body is preferably enlarged to provide a round portion 21 which is dished or concave and merges with the rectangular chamber.

The housing, as shown in Figure 3, is provided with a pair of corresponding internal axially extending formations 22 and a centrally disposed axial formation 23. It will be noted that the formations 22 are integral with the side wall 15 of the housing and that the center formation is also joined thereto by a web 24. These formations impart strength to the housing. The outer ends of the formations 22 provide substantially diametrically disposed seats for the ends 25 of a bridge or bracket 26 secured on the seats by screws 27. The spindle 2 is preferably permanently and rigidly attached to the bridge by expanding a square portion of the spindle into a square opening in the bridge. Obviously, other means may be utilized to secure the bridge and spindle together. The center formation 23 is provided with an axial hole 28 and the spindle is provided with an inner reduced cylindrical end portion 29 which extends into the hole to assist in positively maintaining the spindle in an erect or axial position. The ends 25 of the bridge are offset to impart strength to the bridge and assure that the ends will engage the seats therefor. In other words, as shown in Figure 2, the central part of the bridge is spaced from the center formation 23 for clearance in order that the bridge is supported only on the formations 22 and the spindle is stabilized by the center formation. The bridge and spindle constitute a subassembly and the various components mounted on the spindle will be described subsequently.

Figure 7:
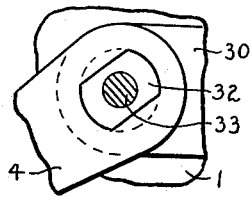
Figure 7 is a partial view showing the manner of attaching a crank to the drive shaft for the drive gear.
Figure 8:
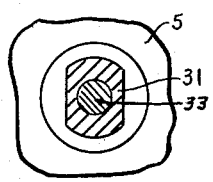
Figure 8 is a transverse section taken substantially on line 8—8 of Figure 2.

The side wall 16 of the housing is formed with a longitudinal integral offset 30 which joins with the round portion 21 of the housing to re-enforce the latter and serve as a bearing for the tubular drive shaft 3 and as a support for the slidable stop 13. This offset is provided with a transverse hole within which the tubular drive shaft 3 is journalled. The inner end of this shaft is preferably keyed to the drive gear 5 by providing the shaft with a squared portion 31 which seats in a squared recess formed in the hub of the gear as shown in Figures 2 and 8. The outer end of the shaft is similarly provided with a squared portion 32 which is received in a squared opening in the inner end of the crank 4 as shown in Figures 2 and 7. A locking element 33 extends through the crank and drive shaft and has a threaded portion engaging a threaded aperture 34 in the hub of the drive gear. This element also has a head provided with a slot to receive the blade of a screwdriver for manipulating the element to detachably interlock the parts in their respective operative positions so that when a handle 35 on the outer end of the crank is manipulated to turn the crank the drive shaft and drive gear will be simultaneously rotated. Obviously, any suitable means, other than those described, may be employed to key the shaft to the gear and crank. When the stop 13 is in the inoperative or retracted position shown in Figure 2, the drive gear can be rotated in either direction to rotate the driven gear member 6 and the components associated therewith. It will be noted that the hub of the drive gear engages the inner surface of the side wall 16 of the housing and that a washer 36 is disposed on the locking element between the crank and the head of the element.

The driven gear member 6 is rotatably supported on a cylindrical portion 37 of the spindle and includes a pinion gear 38 which bears against the bridge and meshes with the drive gear. The driven member also includes a cylindrical portion extending through an opening 39 in a flat base wall 40 of the rotor. The member 6 further includes a large round flat portion 41 which is suitably secured against the outer surface of the base wall of the rotor, preferably by three equally spaced apart rivets 42. The diameter of the rotor is somewhat greater than the diameter of the round portion 41 of the gear member, diameter of the round portion 21 of the housing, and is provided with a forwardly extending annular peripheral wall portion 43. The rotor is preferably held in spaced relation to the round portion 21 of the housing and since the driven gear member 6 only engages the spindle and merely bears against the bridge and the tubular bearing 11 which supports the spool, friction is reduced to a minimum so that the rotor and driven member as a unit may freely rotate on the spindle and also noiselessly due to the fact that the gears are preferably made from nylon or equivalent non-metallic material.

Figure 6:
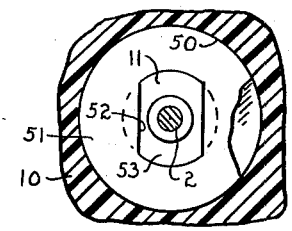
Figure 6 is a partial transverse section taken through the spool showing a friction member keyed to the tubular bearing on which the spool is mounted.

The front side of the round portion 41 of the driven gear member is formed with a boss 44 provided with a clearance recess 45 for receiving a pair of axial projections 46 provided on the tubular bearing 11. These projections, in turn, receive or straddle a squared portion 47 at the forward end of the cylindrical portion 37 of the spindle to key the bearing against rotation on the spindle. The bearing 11 includes a radial annular flange 48 of a size to bear against the boss 44 on the driven gear member and nest within a round recess 49 provided in the rear side of the spool 10. The bearing also includes a cylindrical portion which extends into an opening in the spool for supporting the spool thereon. The front side of the spool, as shown in Figures 2 and 6, is provided with a recess 50 similar to the recess 49. A washer 51 is disposed in the recess 50 and is provided with a squared opening 52 which receives a squared forward end 52 of the bearing for keying the washer thereto. Obviously, means other than those shown and described may be employed to key the tubular bearing to the spindle 2 and washer 51.

A friction washer 54, preferably constructed of some desirable resilient material, such as leather, surrounds the tubular bearing 11 and is seated in the rear recess 49 of the spool and engages the radial flange 48 on the bearing. A similar friction washer 55 surrounds the bearing and is seated in the front recess 50 of the spool and engages the washer 51 constituting a flange axially spaced from the flange 48.

A small nut 56 is threadedly connected to a threaded end 57 of the spindle and engages the tubular bearing 11 for holding the bearing and the driven gear member and rotor on the spindle with the pinion in mesh with the teeth of the drive gear 5. This nut is knurled to facilitate manipulation.

A larger nut 58 is also threadedly connected to the threaded end portion 57 of the spindle for holding the spool and washers 51, 54 and 55, including a helical spring 59, in place. This nut is provided with a conical knurled surface to facilitate manipulation of the nut and is also provided with a rear round recess 60 within which one end of the spring is seated. The other end of the spring bears against the washer 51. By manipulating the nut 58, the pressure exerted by the spring may be varied to control the amount of friction of drag desired between the spool and its bearing 11.

It will be noted that the spool includes a front annular flange 61 and a rear annular flange 62, with a hub 63 joining the flanges. The front flange is preferably of a slightly lesser diameter than the rear flange to facilitate release and retrieving of the line with respect to the spool. The rear flange 62 of the spool is provided with a rearwardly extending peripheral flange 64. This peripheral flange is interposed between the round portion 41 of the driven member 6 and the peripheral wall flange 43 of the rotor and serves to prevent a line from being inadvertently caught between the spool and rotor and/or driven member 6.

Figure 4:
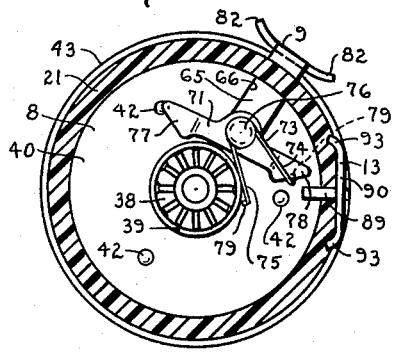
Figure 4 is a transverse sectional view taken substantially on line 4—4 of Figure 2.
Figure 9:
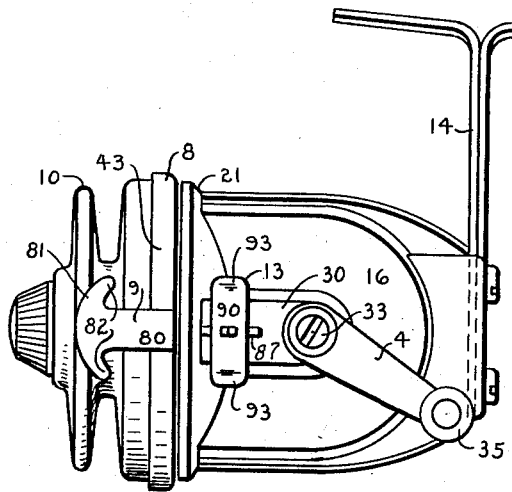
Figure 9 is a view similar to Figure 1, showing the mounting means of the reel in a reversed position.

The dual pick-up device 9 and dual pawl device 12 will now be described. The pick-up device includes a radial leg 65 secured in a radial channel formation 66 in the underside of the round base portion 40 of the rotor. If desired, the rotor may be provided with an integral arm fashioned to constitute the pick-up. The channel formation in turn is disposed in a radial recess 67 provided in the round portion 41 of the driven gear member 6. The leg 65 of the device is secured in the formation 66 by a rivet 68 and the round portion 41 of the gear member is provided with a hole 69 to permit such securement. This rivet serves to connect the pawl device to the leg 65 of the pick-up device. The rivet includes a portion 70 on which an elongated pawl 71 is pivotably supported; a portion 72 surrounded by the coil of a spring 73 having legs 74 and 75; and a head 76 which holds the spring on the rivet. The pawl is provided with a pair of offset cam ends 77 and 78. The free end of each of the legs of the spring is provided with a hook 79 and, as shown in Figure 4, the hook 79 on leg 74 is caught on the cam end 78 with the leg 75 of the spring bearing against the cylindrical portion of the pinion gear to force the margin of a notch in an edge of the pawl against the said cylindrical portion to resiliently maintain the cam end 78 in a normal position for engagement with the stop 13 when the latter is in an operative or extended position. When the stop is in an operative position and the driven gear member and rotor and pawl 21 are rotated in a counter-clockwise direction about the axis of the spindle, as viewed in Figures 4 and 9, the cam end 78 will intermittently strike the stop and cause the cam end to swing away from the pinion and when it passes beyond the stop, the cam end will snap back against the pinion and produce a clicking sound. Rotation of the gear member and rotor in an opposite or clockwise direction will cause the cam end to engage the stop and prevent further rotation in such direction. In other words, the reel as shown in Figures 4 and 9 has been set up for left hand operation with the mounting means 14 engaging the underside of a rod or pole.

The arrangement is such that the operative position of the pawl can be readily modified so that its other cam end 77 will strike the stop 13. This is accomplished by merely pivoting the spring 73 on the rivet 68 in a reversed position and then securing the hook 79 on the leg 75 of the spring to the cam end 77 with the other leg 74 of the spring bearing against the pinion. With this reorganization, the reversal of the mounting means 14, as shown in Figures 1 and 2, the rotor, driven gear member and pawl device may be rotated in different directions for right hand use.

The pick-up or directing device 9, as mentioned above, includes the radial leg 65. This radial leg is provided with a forwardly extending axial leg 80 which terminates in an arcuate or crescent shaped enlarged extremity 81 having offset ends 82 to form with the leg 80 a pair of corresponding circumferentially spaced generally V-shaped line guiding means or notches 83. When the reel is assembled for use by a right handed person, one of the notches will be used for guiding a line onto the spool and when converted over for use by a left handed person, the other of the line guiding means is utilized. This pick-up is unique because it is readily available for use by either a left or right handed person. The use of either line guiding means is, of course, dependent on the selected operative position of the pawl and the mode of attaching the mounting means 14 to the reel housing and pole. The line is preferably operatively connected and disconnected to the line pick-up by manipulating the index finger, the latter of which is normally located adjacent the fore extremity of the reel when the pole is properly embraced by a hand.

It is to be understood that the pick-up device may be construed to include the driven member 6, rotor 8 and part designated 9 because they constitute a composite unit. It is to be further understood that, if desired, the driven member, rotor and part 9 can be of a one-piece construction.

The stop 13 above referred to, and constituting movable means, is preferably mounted on the longitudinal offset 30. The chamber of the housing or inner end of the offset is provided with an axially extending recess 84 open at its forward end as indicated at 85. The stop 13 includes a flat member 86 which is longitudinally slidable in a slot 87 extending transversely through a wall of the housing and/or offset 30. The inner edge of the member 86 is provided with corresponding lateral lugs 88 which slide in the recess 84. The forward edge of the member 86, as shown in Figure 2, is provided with a projection 89 for engagement with either of the cam ends 77 or 78 of the pawl 71 depending on the hookup of the pawl. A manual operable element 90 is preferably secured to the slidable member 86 by a projection 91 on the member extending through a rectangular hole 92 in the element. The projection is upset to permanently secure the element and member together. The element 90 is preferably provided with inturned ends 93 which more or less straddle the offset 30 and facilitate manipulation of the element to a forward position to place the projection 89 in the path of the pawl end selected or to a rear position to permit rotation of the rotor and components associated therewith in a clockwise or counter-clockwise direction. The stop 13 is secured in such a manner that it is automatically held in any longitudinal position to which it is adjusted.

Figure 10:
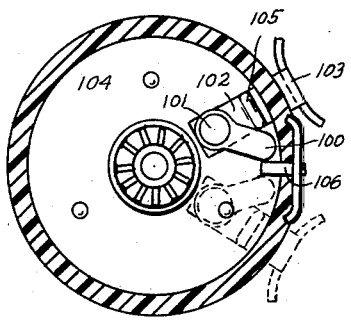
Figure 10 is a sectional view showing a modified form of a pawl device.

As exemplified in Figure 10, a modified form of pawl mechanism is depicted. This mechanism eliminates the spring 73 and comprises a pawl 100 pivoted at 101 at its inner end to a leg 102 of a line pick-up 103. The leg of the pick-up is secured in a radial channel formation provided in the base wall of a rotor 104. The line pick-up is of the dual character above referred to, and the leg 102 thereof is preferably provided with an abutment 105 which is engaged by the free end of the pawl when the rotor is rotated in a clockwise direction and strikes against one side of a manual operable stop 106. As shown by the full line position of the pawl, the rotor is held against rotation in a clockwise direction. When the rotor is rotated in a counter-clockwise direction the free end of the pawl will merely strike against and pivotally pass over the stop. Obviously, when the stop is retracted, the rotor can be rotated in either direction. The pawl shown in the full line position is to facilitate use of a reel by a right handed person, but, if desired, the pawl can be readily converted for use by a left handed person by merely swinging the pawl over to the dotted line position and then reversing the mounting means or bracket as in the structure above described. When the operative position of the pawl is modified in this way, the free end of the pawl will engage the abutment and the other side of the stop to limit rotation of the rotor in a counter-clockwise direction.

Having thus described by invention, it is obvious that various modifications may be made in the same without departing from the spirit of the invention, and, therefore, I do not wish to be understood as limiting myself to the exact forms, constructions, arrangements and combinations of parts herein shown and described.

I claim:

A rotor for a fishing reel, said rotor being provided with a pinion gear, a fastener secured to the rotor, an elongated pawl pivotally connected intermediate its extremities to the fastener, and a spring connected to the fastener and having a pair of legs with one of the legs engaging the gear and the other leg engaging one of the extremities of the pawl for maintaining the pawl in a predetermined operative position, said spring being connectible to the fastener in a different position so that the said one and other legs of the spring will respectively engage the other extremity of the pawl and the gear to maintain the pawl in a different operative position.

References Cited in the file of this patent

UNITED STATES PATENTS

| | | |
|---|---|---|
| 302,925 | Miehling | Aug. 5, 1884 |
| 1,053,612 | Keyes | Feb. 18, 1913 |
| 1,592,287 | Schmid | July 13, 1926 |
| 1,960,285 | Russell | May 29, 1934 |
| 2,495,621 | Young et al. | Jan. 24, 1950 |
| 2,521,543 | Shakespeare et al. | Sept. 5, 1950 |
| 2,546,465 | Martini | Mar. 27, 1951 |
| 2,615,647 | Palmer et al. | Oct. 28, 1952 |
| 2,615,649 | Flewelling | Oct. 28, 1952 |
| 2,627,383 | Tibbetts | Feb. 3, 1953 |
| 2,641,419 | Cowen et al. | June 9, 1953 |
| 2,650,040 | Glaser | Aug. 25, 1953 |
| 2,652,990 | Ferguson | Sept. 22, 1953 |
| 2,734,693 | Rabezzana | Feb. 14, 1956 |
| 2,772,839 | Morton | Dec. 4, 1956 |
| 2,775,417 | Freund | Dec. 25, 1956 |

FOREIGN PATENTS

| | | |
|---|---|---|
| 418,837 | Great Britain | Nov. 1, 1934 |
| 602,922 | Great Britain | June 4, 1948 |